(12) United States Patent
Tremmel et al.

(10) Patent No.: US 6,557,931 B1
(45) Date of Patent: May 6, 2003

(54) COVER DEVICE FOR ASSEMBLY RECESSES ON ROOF-DRIP MOLDINGS OF MOTOR VEHICLE BODIES

(75) Inventors: Gunter Tremmel, Schworstadt (DE); Jan Regensburger, Kandem (DE); Maurizio Piria, Herscheid (DE)

(73) Assignee: A. Raymond & Cie (FR)

( * ) Notice: Subject to any disclaimer, the term of this patent is extended or adjusted under 35 U.S.C. 154(b) by 0 days.

(21) Appl. No.: 10/031,801
(22) PCT Filed: Apr. 18, 2000
(86) PCT No.: PCT/EP00/03511
§ 371 (c)(1), (2), (4) Date: Mar. 8, 2002
(87) PCT Pub. No.: WO00/66397
PCT Pub. Date: Nov. 9, 2000

(30) Foreign Application Priority Data

Apr. 30, 1999 (DE) .......................................... 199 19 852

(51) Int. Cl.⁷ .............................................. B60D 25/06
(52) U.S. Cl. ...................... 296/213; 296/210; 224/309
(58) Field of Search ................................ 296/210, 213, 296/208, 37.7; 224/309, 328, 329

(56) References Cited

U.S. PATENT DOCUMENTS

| | | | | |
|---|---|---|---|---|
| 5,013,083 A | * | 5/1991 | Yada et al. | 296/213 |
| 5,413,398 A | * | 5/1995 | Kim | 296/210 |
| 5,829,825 A | * | 11/1998 | Kim | 296/210 |

FOREIGN PATENT DOCUMENTS

| | | |
|---|---|---|
| DE | 36 37 856 A | 5/1988 |
| DE | 197 45 757 A | 4/1999 |
| EP | 0827 870 | 3/1998 |

\* cited by examiner

*Primary Examiner*—Joseph D. Pape
(74) *Attorney, Agent, or Firm*—Gifford, Krass, Groh, Sprinkle, Anderson & Citkowski, P.C.

(57) ABSTRACT

The invention relates to a cover device for sealing assembly recesses on roof-drip moldings of motor vehicle bodies that run in the longitudinal direction of the vehicle. The device consists of a cover holder (9) that can be placed in the roof-drip molding (1) in the area of the recess and a cover (8), which is mounted in such a way that it can pivot crosswise to the longitudinal direction of the roof-drip molding, for sealing the recess (5). Said cover holder (9) also has a recess (16) in its floor part (10). Mountings (17) are molded on both sides at one end of the recess (16) and have bearing journals (18) that face each other and that engage in corresponding, lateral bearing holes (19) that are provided at one end of the cover (8), in such a way that they can expand elastically. A support (20) on which the cover (8) rests in its closed position is located at the other end of the recess (16). If necessary, this support (20) can be provided with detent elements (21) which engage in corresponding partner detent elements (22) underneath the cover (8) in order to secure the cover in its closing position. The part of the cover (8) that projects over the bearing holes (19) is configured with a pressure plate (25) which rises slightly above the roof-drip molding (1). When the pressure plate (25) is pushed downwards in the direction of arrow (P), the detent elements (21) are released from the partner detent elements (22) so that the cover (8) can easily be pivoted up into the opening position, hereby exposing the recess (5) for attaching a luggage rack.

11 Claims, 2 Drawing Sheets

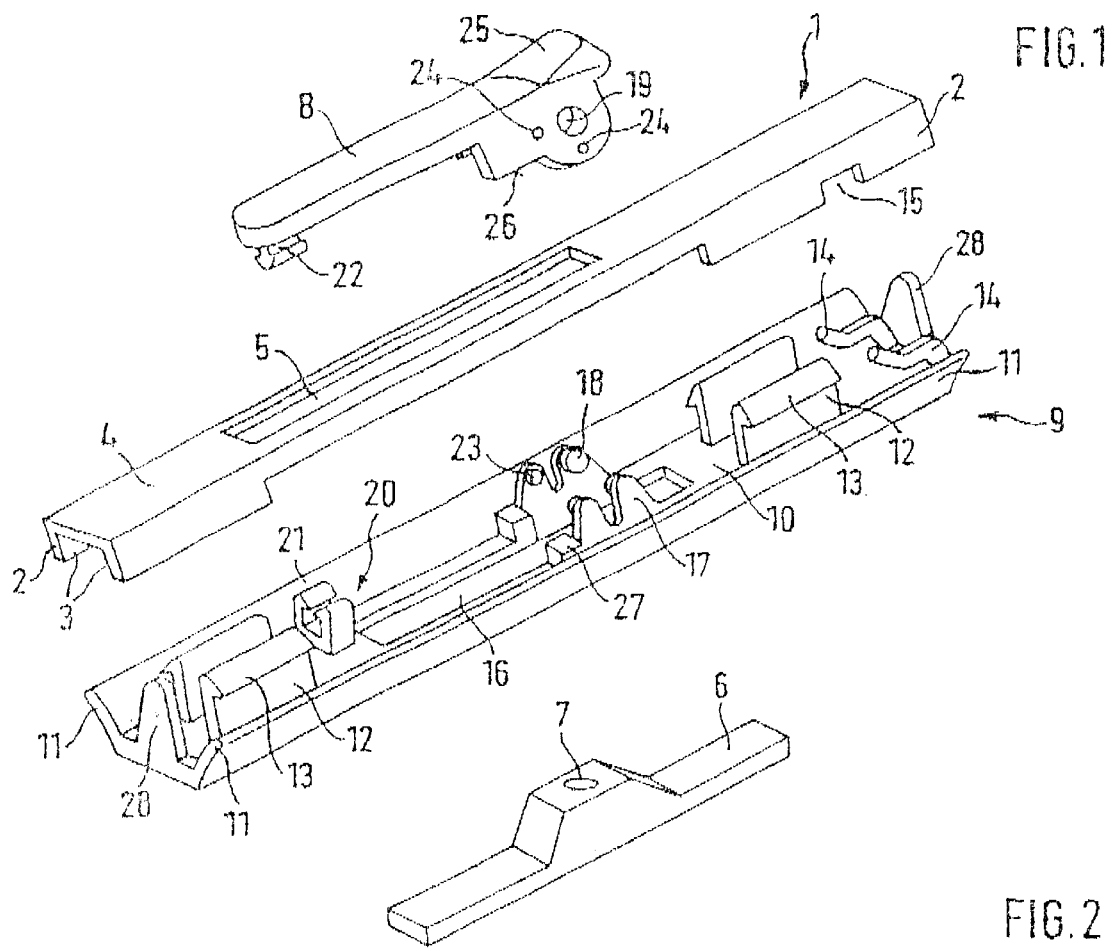
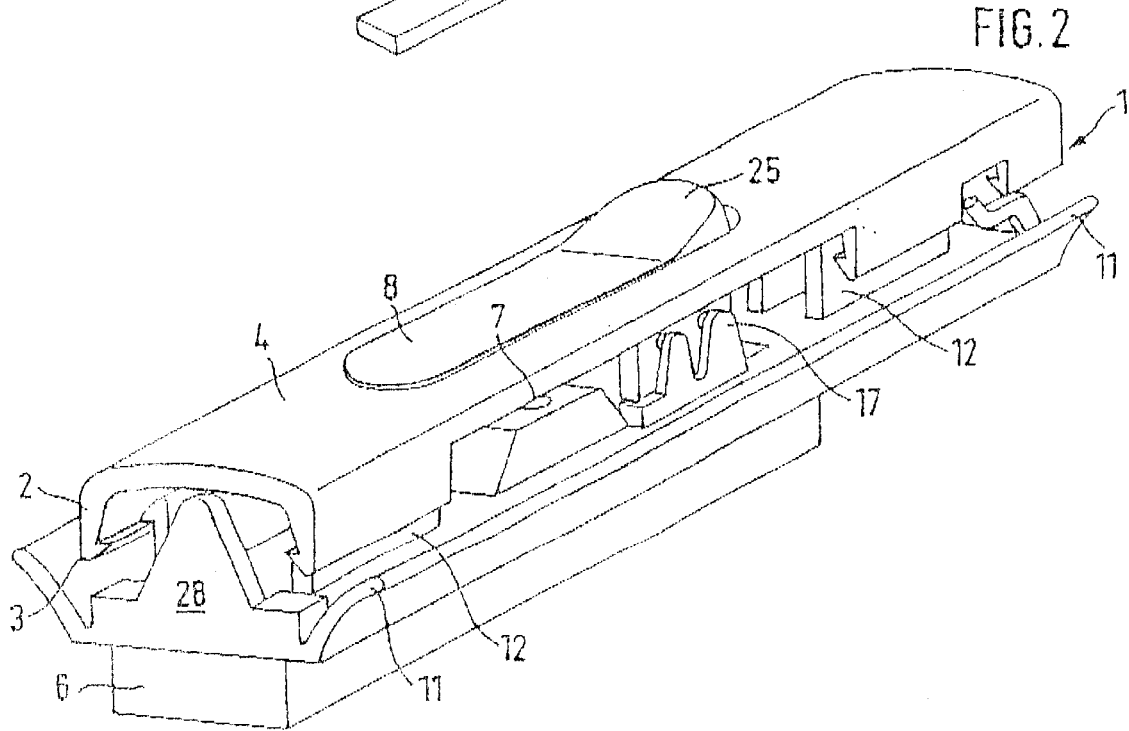

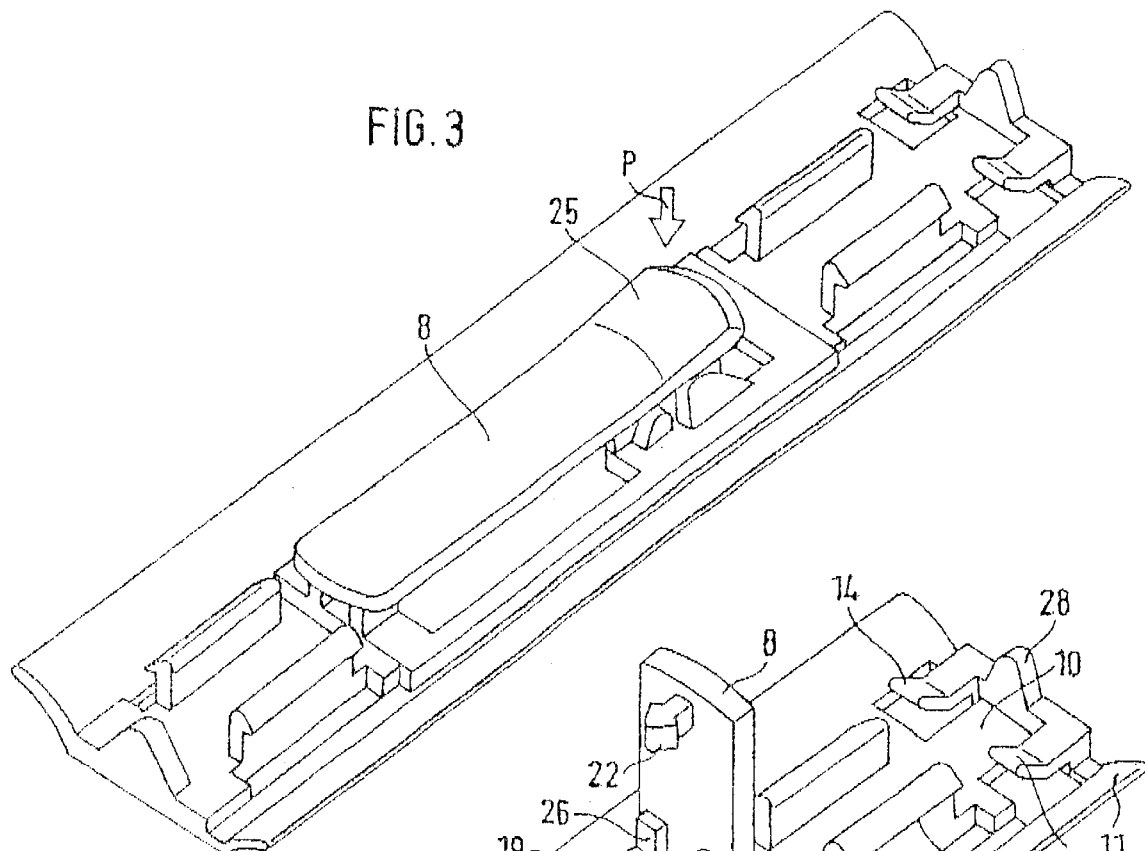
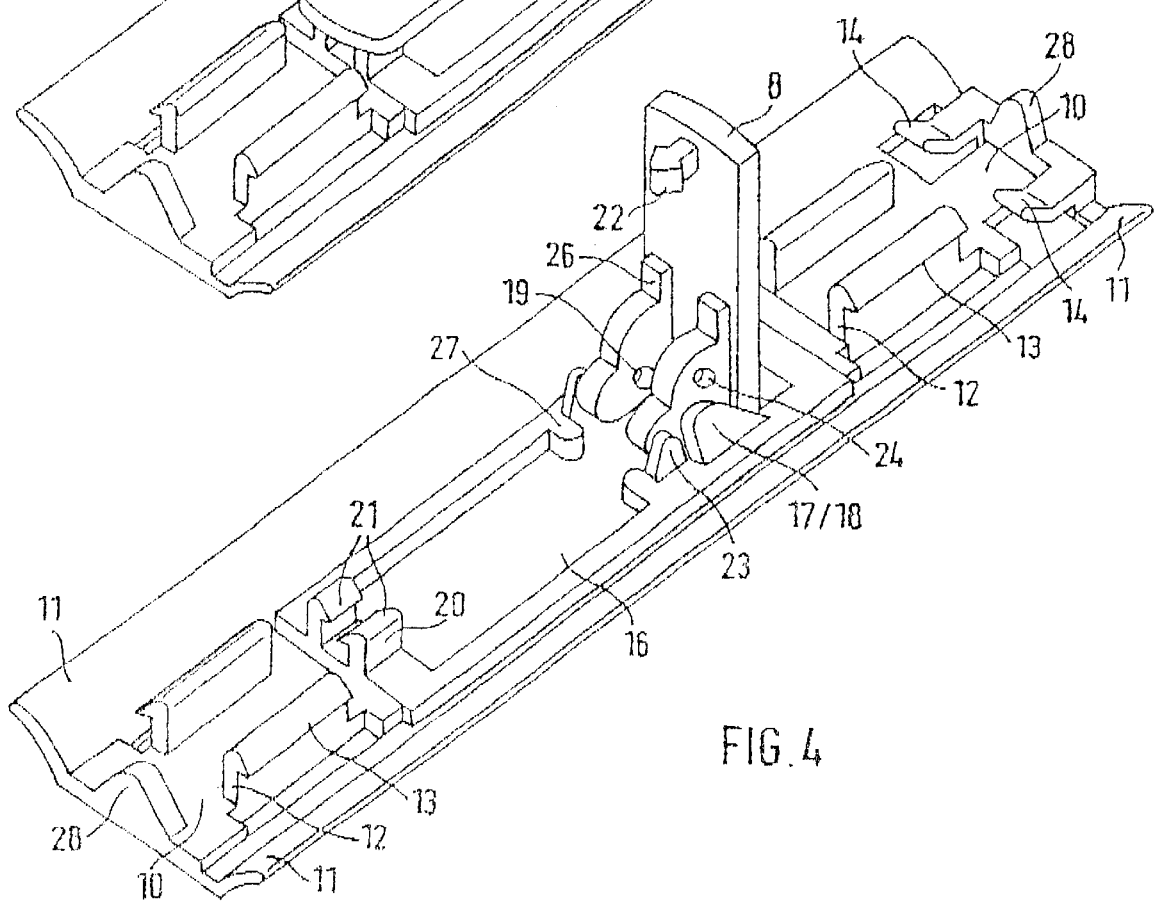

COVER DEVICE FOR ASSEMBLY RECESSES ON ROOF-DRIP MOLDINGS OF MOTOR VEHICLE BODIES

BACKGROUND OF THE INVENTION

Roof-drip moldings with integrated rubber moldings are usually used to cover assembly recesses in automobile bodies, the moldings being tightly supported and held in the roof channel by projecting sealing lips. In order to mount luggage racks or the like, these roof drip moldings generally have elongated recesses on their upward-facing cross wall at the points where the corresponding anchoring points are located in the bottom of the roof channel.

One such cover device for assembly recesses in roof-drip moldings is known from DE 36 37 856 A1. Therein, the cover device consists of a cover holder that can be inserted in the roof-drip molding in the area of the recess. A cover is seated so as to pivot transverse to the longitudinal direction of the roof-drip molding to close the recess. The cover holder in this case has a recess in its bottom part and has a contact surface at the end of this recess for supporting the cover in its closed position.

In order to obtain a rattle-free guidance of the cover in this cover device, a leaf spring made of spring steel that forms an elastically yielding glide path for a cam of the cover is arranged at one side on the underside of the cover molding. This rattle-free guidance of the cover, however, not only requires the additional installation of a metal spring and a corresponding channel depth; the constructive effort for it is also considered very labor- and cost-intensive.

SUMMARY OF THE INVENTION

The objective of the present invention is to create a cover device that not only can be produced more economically, but that can also be installed without problems even for smaller profile cross sections of the roof-drip molding or shallower channel depths, and can be easily made effective for its intended application.

This objective is satisfied in the invention in that, on both sides at the opposing end of the recess, mountings are molded on having bearing journals that face one another which elastically engage in corresponding bearing holes provided laterally at one end of the cover.

BRIEF DESCRIPTION OF THE DRAWINGS

Additional characteristics of the invention are specified in the subordinate claims and are to be explained in greater detail below on the basis of an embodiment illustrated in the drawings.

FIG. 1 is a perspective view of a roof-drip molding with a cover device and receptacle, before assembly;

FIG. 2 is a perspective view of the roof-drip molding with the cover device and receptacle part installed, and with the cover closed;

FIG. 3 is a perspective view of the cover device with the cover in the closed position; and FIG. 4 is a perspective view of the cover device with the cover in the open position.

DETAILED DESCRIPTION OF THE PREFERRED EMBODIMENT

The cover device illustrated in the Figures serves to close off an assembly recesses in roof-drip moldings 1 that are used for covering roof channels in automobile bodies.

As is evident from FIGS. 1 and 2, roof-drip molding 1 is formed with an inverted U-shaped cross section. The side molding 1 has a pair of strips 2 with inward-facing catch edges 3 at their lower free edge. A cross wall 4 extends between the upper edges of the side strips 2. The cross wall 4 has an elongated rectangular recess 5 defined therein, which serves for the introduction of mounting studs of luggage racks or other constructions. To accommodate these studs, a receptacle part 6 is anchored underneath recess 5 in the bottom of the roof channel. The receptacle part 6 may include, for instance, a receptacle hole 7 for receiving threaded bolts.

A cover 8 is illustrated above molding 1 in FIG. 1. The cover is preferably manufactured from plastic and similar to recess 5 in length and width. Cover 8 is pivotally supported by a cover holder 9, which is positioned below molding 1. The cover holder 9 consists of an elongated bottom part 10, which is preferably formed from hard plastic. The holder 9 has a width sized to fit the width of the roof channel. Upward-inclined sealing lips 11, formed of soft plastic, are molded onto the long side edges of bottom part 10 using a two-component injection molding process. The lips 11 make sealing contact with the side walls of the roof channel when the holder 9 is installed.

Two opposing fastening legs 12 are molded on and extend upwardly from bottom part 10 near each of its ends. The legs 12 have outward-projecting catch edges 13 at their upper free ends. These catch edges 12 are positioned between the side strips 2 of the molding 1 when roof-drip molding 1 is attached to the cover holder 9, and the catch edges 13 engage with catch edges 3. Two upward-inclined catch fingers 14 are elastically molded onto one end of bottom part 10. The catch fingers 14 engage corresponding incisions 15 in catch edges 3 when the molding 1 is installed, in order to prevent the molding 1 from moving end to end.

At both ends of bottom part 10, there are also spacers 28 molded on, which support roof-drip molding I at a predetermined height above cover holder 9 (see FIG. 2) after molding I is positioned on top of fastening legs 12 and catch edges 3 engage underneath catch edges 13.

Bottom part 10 has a recess 16 underneath recess 5 in the roof-drip molding 1. Receptacle part 6 extends through the recess 16 when the cover holder 9 is installed. Mountings 17 extend upwardly from the bottom part 10 on opposite sides of recess 16. The mountings have bearing journals 18 which face one another. The bearing journals 18 engage in corresponding bearing holes 19 in the sides of cover 8, near one end. The mountings 17 are molded onto bottom part 10 near one end of recess 16. The bearing journals 18 project towards each other only to such an extent that they can snap into bearing holes 19 due to the elastic bending of mountings 17.

At the other end of recess 16 there is a support 20 serving to support cover 8 in its closed position. This support 20 is preferably provided at its upper end with detents 21 which interact with a corresponding detent 22 underneath cover 8 and hold it in place in the closed position in the manner of a snap fastener.

To hold cover 8 securely in place in the upward-pivoted open position of FIG. 4, two opposing catch tabs 23 are molded onto bottom part 10 alongside mountings 17. The catch tabs 23 can elastically flex away from one another and are each associated with two recesses 24 in cover 8. The recesses 24 are adjacent bearing holes 19 and are offset from one another by 90° with respect to the direction of rotation for opening. Catch tabs 23 can snap into these recesses 24 both when cover 8 is opened and when it is closed.

In order to be able to bring cover 8 more easily from the closed position to the opened position shown in FIG. 4, the part of cover 8 projecting above bearing holes 19 is constructed as a pressure plate 25. The pressure plate projects above the edge of recess 5 sufficiently such that when pressure plate 25 is pressed downwards in the direction of arrow P (see FIG. 3), detents 21 and 22 disengage and cover 8 can easily be pivoted upwards.

For the secure support of cover 8 in the closed positions, additional contact surfaces 26, associated with corresponding support surfaces 27 in cover holder 9, are provided on the underside of cover 8 in front of bearing holes 19 on the contact side. In this manner, bearing journals 18 are relieved of pressure in the closed position of cover 8.

As is evident from FIGS. 3 and 4, in addition to recess 16 for receptacle part 6, bottom plate 10 has additional openings in the area of elastic legs 12 and catch finger 14. These are provided for reasons of mold-release technology in the injecting mold necessary for manufacturing cover holder 9 and have no significance to the construction of cover holder 9 according to the invention.

What is claimed is:

1. A cover device for assembly recesses in roof-drip moldings running in the longitudinal direction of the vehicle on automobile bodies, comprising:

a cover holder that can be inserted into a roof-drip molding in the area of a stud receptacle recess; and a cover seated so as to pivot transverse to the longitudinal direction of said roof-drip molding to close off said stud receptacle recess, wherein said cover holder likewise has a complementary recess in its bottom part having a support formed at one end for supporting the cover in a closed position, said complementary recess further having mountings on both sides at an opposing end which include bearing journals that face one another that elastically engage corresponding bearing holes provided laterally at one end of the cover.

2. A cover device according to claim 1 further comprising two elastically movable and opposing catch tabs molded onto said bottom part alongside said mountings, whereby said tabs are associated with complementary recesses formed in the cover alongside said bearing holes that are offset from one another by approximately 90° contrary to the direction of rotation for opening for elastic engagement of the catch tabs when the cover is in the open position.

3. A cover device according to claim 1 wherein said support is a detent means which engages a complementary detent means formed on the underside of the cover in snap fit engagement for retaining the cover in a closed position.

4. A cover device according to claim 1 wherein said bearing holes are positioned a short distance before the end of the cover.

5. A cover device according to claim 1, wherein said cover includes additional contact surfaces associated with corresponding support surfaces formed on the cover holder such that said contact surfaces rest on said support surfaces when the cover is in the closed position, the contact surfaces being provided on the underside of the cover in front of said bearing holes.

6. A cover device according to claim 2 wherein said support is a detent means which engages a complementary detent means formed on the underside of the cover in snap fit engagement for retaining the cover in a closed position.

7. A cover device according to claim 2 wherein said bearing holes are positioned a short distance before the end of the cover.

8. A cover device for covering a stud receptacle recess in a longitudinal roof-drip molding used on automobile bodies wherein said molding is seated in a roof channel, said device comprising:

an elongated cover holder having a bottom surface and upwardly inclined sealing lips extending along elongated opposing edges of said holder, said bottom surface having a width sized to fit the width of the roof channel and including an opening having perimeter dimensions substantially equivalent to the perimeter dimensions of said stud receptacle recess such that said opening aligns with said recess when the holder is mounted within the roof channel beneath said molding, the bottom surface further including upwardly extending retaining legs that engage complementary retaining edges formed on said molding; and a cover having laterally opposing bearing holes formed at one end, said bearing holes dimensioned to engage corresponding bearing journals formed on support posts formed adjacent one end of the opening in the holder such that said cover has pivotal movement about an axis transverse to the longitudinal direction of the molding.

9. The cover device of claim 8 wherein the holder further includes two sets of opposing catch tabs that engage corresponding recesses formed in the cover alongside the bearing holes wherein said corresponding recesses are offset substantially 90 degrees from one another.

10. The cover device of claim 8 wherein the cover further includes a snap fastener portion formed at an end opposite the bearing holes that engages a complementary snap fastener portion formed on the bottom surface of the holder whereby said fastener portions engage to hold said cover in a closed position.

11. The cover device of claim 8 wherein the cover further includes additional contact surfaces formed adjacent the bearing holes whereby said surfaces associate with complementary contact surfaces formed on the bottom surface of the holder when the cover is closed such that pressure is relieved from the bearing journals.

* * * * *

UNITED STATES PATENT AND TRADEMARK OFFICE
CERTIFICATE OF CORRECTION

PATENT NO. : 6,557,931 B1
DATED : May 6, 2003
INVENTOR(S) : Tremmel et al.

It is certified that error appears in the above-identified patent and that said Letters Patent is hereby corrected as shown below:

Column 2,
Lines 37 and 39, replace "I" with -- 1 --.

Signed and Sealed this

Twelfth Day of August, 2003

JAMES E. ROGAN
*Director of the United States Patent and Trademark Office*